United States Patent [19]

Mullet et al.

[11] 4,200,155
[45] Apr. 29, 1980

[54] LAWN EDGER ATTACHMENT

[75] Inventors: David L. Mullet, Hesston; Raymond J. Rilling, Moundridge; Elmer D. Voth, Newton, all of Kans.

[73] Assignee: Excel Industries, Inc., Hesston, Kans.

[21] Appl. No.: 938,636

[22] Filed: Aug. 31, 1978

[51] Int. Cl.$^2$ ............................................. A01G 3/06
[52] U.S. Cl. ...................................... 172/14; 56/256; 172/15
[58] Field of Search .............. 172/13, 14, 15, 16, 172/17, 26, 23, 190; 56/256; 180/79, 131; 104/244.1; 280/78.2

[56] References Cited

U.S. PATENT DOCUMENTS

| | | | |
|---|---|---|---|
| 1,977,273 | 10/1934 | Hansen | 104/244.1 |
| 2,630,052 | 3/1953 | Jory | 172/15 |
| 2,906,080 | 9/1959 | Light | 172/14 |
| 3,057,411 | 10/1962 | Carlton | 172/15 |
| 3,548,966 | 12/1970 | Blacket | 180/131 |
| 3,907,039 | 9/1975 | Remley | 172/15 |
| 4,046,200 | 9/1977 | Mullet et al. | 172/14 |

FOREIGN PATENT DOCUMENTS 327889 10/1920 Fed. Rep. of Germany ............ 172/26

*Primary Examiner*—Richard J. Johnson
*Attorney, Agent, or Firm*—John A. Hamilton

[57] ABSTRACT

A lawn edger attachment for power driven vehicles consisting of a rolling coulter blade carried for rotation on a horizontal axis transverse to the line of travel of the vehicle at one end of an arm pivoted at its opposite end to the vehicle on a parallel axis. Power means are provided for pivoting the arm. The blade is cup-shaped in order that earth pressure thereagainst will force it to follow the edge of a paved surface. The blade may be reversed so that the vehicle may operate either on the grass or on the pavement. The arm may be extended either forwardly or rearwardly from its pivot, for convenience in various situations. The arm is a horizontal parallelogram linkage, so that the blade can follow the pavement edge even if the vehicle is not steered precisely parallel to this edge.

10 Claims, 6 Drawing Figures

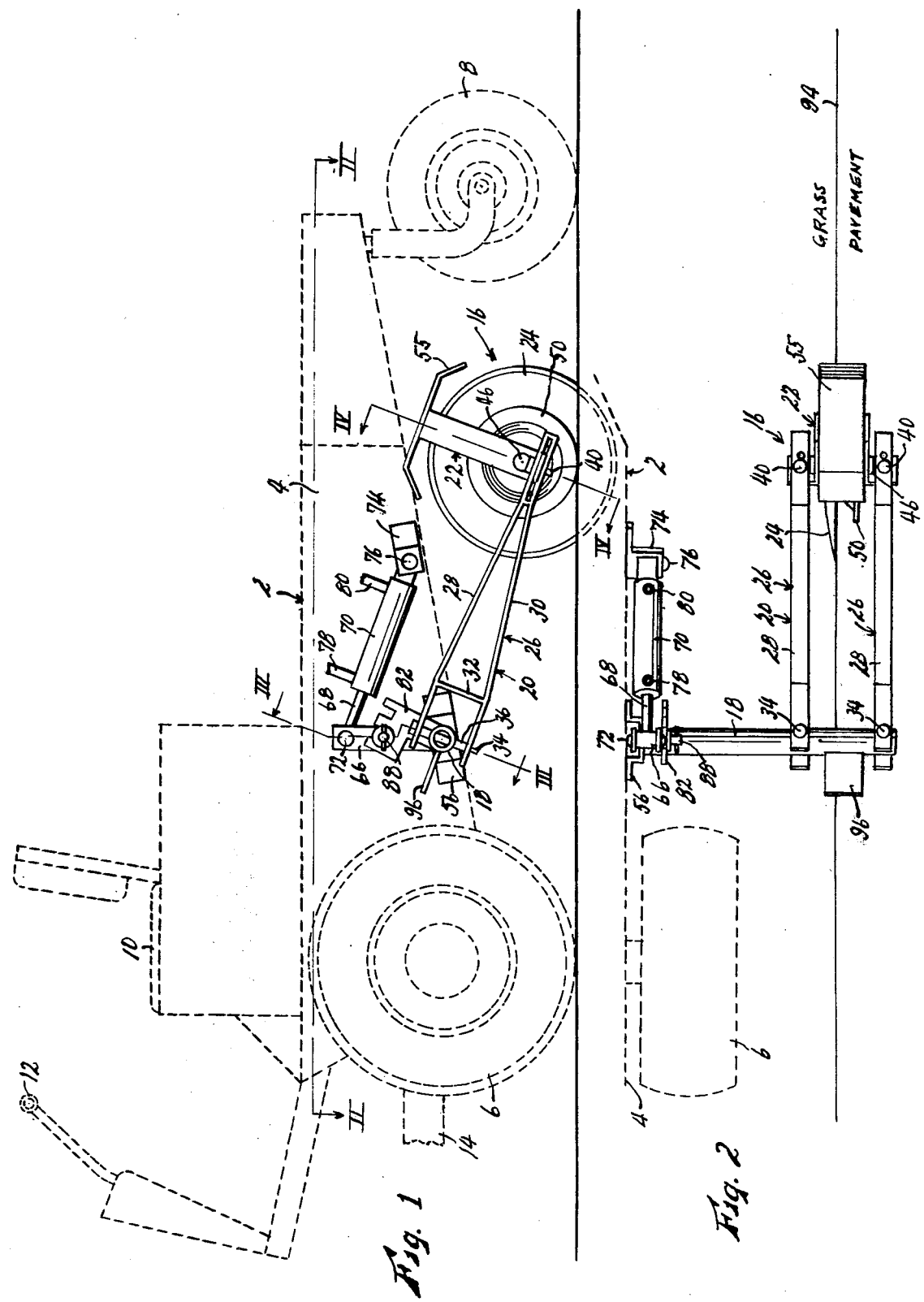

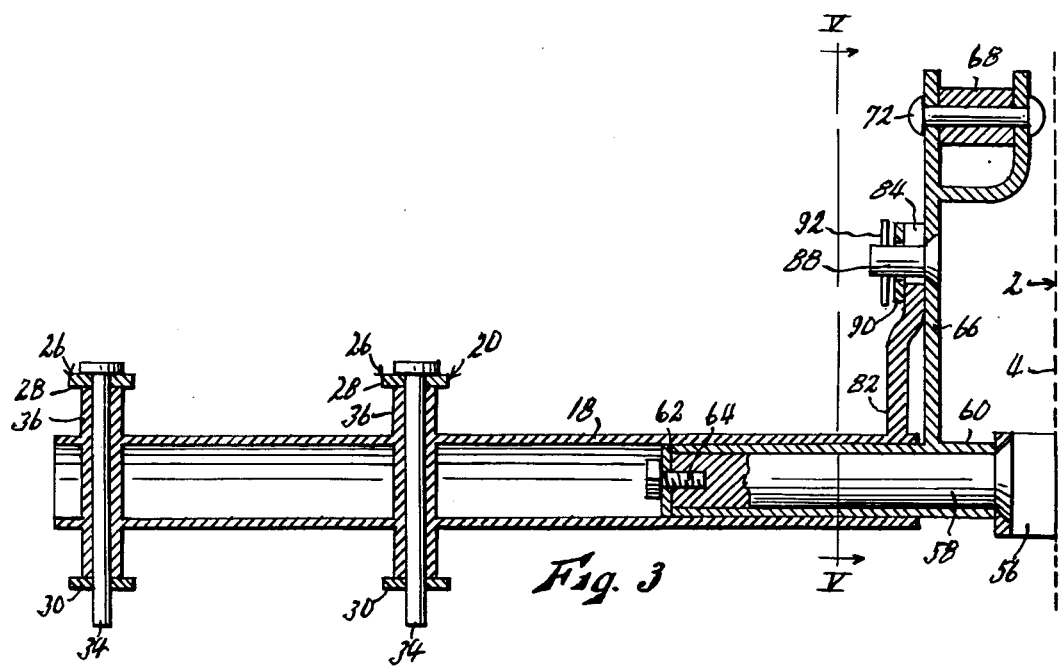
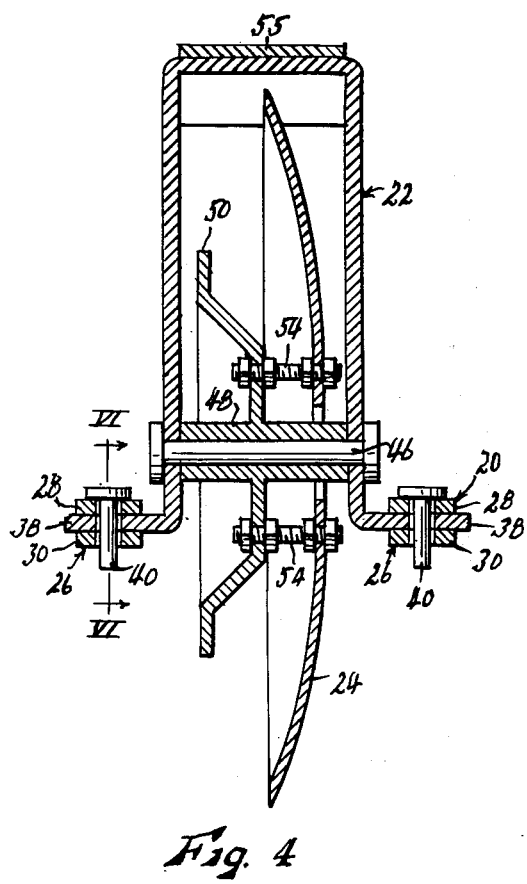
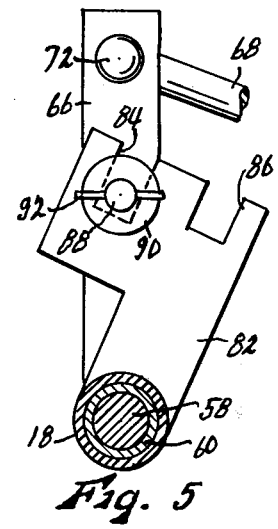
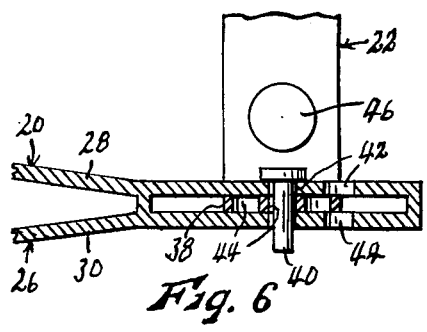

LAWN EDGER ATTACHMENT

This invention relates to new and useful improvements in lawn edgers, that is, devices for cutting grass, and soil, which tends to extend over the surface of adjacent sidewalks, driveways and other paved areas, in order to improve the neatness and appearance of the lawn. This extended grass and soil cannot ordinarily be severed by ordinary lawnmowers, but once severed by the edger, can be disposed of by other means. More particularly, this invention relates to a device of the type described which can be mounted as an attachment on powered vehicles, such as small tractors, so as to be operated by said vehicles.

Various devices of this type have previously been proposed but all such prior devices within our knowledge have had various disadvantages, such as complicated and expensive structure, unwieldiness of operation requiring high skill for successful use, difficulty of causing the blade to follow the pavement edge accurately unless the vehicle is steered with great accuracy, and a requirement that the vehicle always be operated at one side or the other of the pavement edge. Accordingly, the overall object of the present invention is the provision of a lawn edger attachment of the general type described above which overcomes all of the above enumerated disadvantages of prior devices.

More particularly, an object of this invention is the provision of a lawn edger attachment consisting of a rolling coulter blade rotatably mounted on a horizontal axis at one end of an arm pivoted at its opposite end on a parallel horizontal axis relative to the vehicle to which the attachment is mounted, said arm consisting of a parallelogram linkage lying in a plane generally including both the rotational and pivotal axes. Thus the blade may be guided to move laterally of its path to follow a pavement edge accurately even if the vehicle is not steered accurately parallel to said edge, and the "angle of attack" of the blade relative to the pavement will not be changed.

Another object is the provision of a device of the character described wherein the coulter blade is specially shaped so that the ground in which it is engaged exerts a lateral force thereon forcing it toward the pavement edge by pivoting the parallelogram linkage, the linkage permitting this movement with no change in the angle of attack of the blade.

A further object is the provision of a device of the character described including means whereby the angle of attack of the blade may be intentionally changed, which may be necessary of desirable under certain circumstances.

A still further object is the provision of a device of the character described including means whereby the blade may be reversed so that its special shape forces it laterally selectively in either direction. This permits the vehicle to operate either on the grass or on the pavement, either of which may be necessary or desirable under certain circumstances.

Still another object is the provision of a device of the character described in which the blade-supporting arm may be reversed to extend either forwardly or rearwardly from its pivotal axis, this selectivity also being desirable under certain circumstances.

Other objects are simplicity and economy of structure, and efficiency, dependability and convenience of operation.

With these objects in view, as well as other objects which will appear in the course of the specification, reference will be had to the accompanying drawing, wherein:

FIG. 1 is a side elevational view of a small tractor, shown in dotted lines, having a lawn edger attachment embodying the present invention operatively mounted thereon, FIG. 2 is a sectional view, taken generally on line II—II of FIG. 1, showing a top plan view of the attachment, FIG. 3 is an enlarged, somewhat irregular sectional view taken on line III—III of FIG. 1, FIG. 4 is an enlarged sectional view taken on line IV—IV of FIG. 1, FIG. 5 is a sectional view taken on line V—V of FIG. 3, and FIG. 6 is a fragmentary sectional view taken on line VI—VI of FIG. 4.

Like reference numerals apply to similar parts throughout the several views, and the numeral 2 applies generally to a small tractor which has been selected as an example of a vehicle on which the lawn edger forming the subject matter of the present invention may be mounted. Said tractor may include a frame 4 supported by a pair of front drive wheels 6 (one shown) and a rear castered wheel 8, and having a driver's seat 10 and steering controls 12. It may have a tool bar 14 projecting forwardly of the frame, on which other attachments to be driven by the tractor may be mounted, but this is not pertinent to the present invention.

The lawn edger attachment of the present invention is indicated generally by the numeral 16 in FIGS. 1 and 2, and includes generally a tubular shaft 18 extending horizontally and laterally from frame 2, and mounted on said frame for axial pivotal movement by means to be described, an arm 20 connected at its forward end (as illustrated) to the outer end portion of said shaft and extending rearwardly therefrom, a bracket 22 mounted at the rearward end of said arm, and a circular rolling coulter blade 24 carried by said bracket for rotation on a horizontal axis generally parallel to shaft 18. Arm 20 constitutes a parallelogram linkage operable in the plane of the axis of said shaft, consisting of a pair of generally parallel side links 26 each including upper and lower bars 28 and 30 disposed respectively above and below the plane of the parallelogram and connected intermediate their ends by cross bars 32. At their forward ends, the bars 28 and 30 of each side link are disposed respectively above and below shaft 18, and are pivotally connected to said shaft by pivot pins 34 inserted through holes provided in said bars, and through sleeves 36 fixed diametrically in shaft 18. Pivot pins 34 are parallel, diametric to shaft 18, and normal to the plane of the parallelogram linkage. They may be easily removed, but are normally held in place by gravity. The rearward end portions of link bars 28 and 30 of each link are disposed in parallel, closely spaced apart relation.

Bracket 22 is formed of plate stock, and is of inverted U-form, being turned outwardly at each of its lower ends to form an ear 38 engageable slidably between the bars 28–30 of the respective side links 26, as best shown in FIGS. 4 and 6. Each of said ears is secured to its associated link 26 by a pivot pin 40 insertable downwardly through any one of a plurality of longitudinally spaced apart holes 42 formed in bars 28–30, and through one of a series of holes 44 formed in spaced apart relation in the associated ear 38. Pivot pins 40 are parallel to pins 34, and are also easily removable, being normally held in place only by gravity. Side links 26, with shaft 18 as the front link and bracket 22 as the rear link, complete the parallelogram linkage constituting arm 20.

Directly above the bottom of bracket 22, an axle 46 extends horizontally and laterally between the side legs of said bracket, and is affixed therein. The hub 48 of a gauge wheel 50 concentric with the axle is rotatably carried on said axle within the bracket. The circular coulter blade 24 is concentric with axle 46, is also disposed within bracket 22, and is rigidly affixed to gauge wheel 50 by bolts 54. This structure is best shown in FIG. 4. A safety blade guard 55 may be affixed to the upper end of bracket 22. The coulter blade is sharpened at its peripheral edge, and is "cupped", or concavo-convex, in form. Gauge wheel 50 is axially spaced apart from the blade, at the concave side thereof, also as shown in FIG. 4.

Shaft 18 is pivotally mounted on vehicle frame 4 by means best shown in FIGS. 3 and 5. Rigidly affixed to frame 4 by means of a bracket 56 is a short stub shaft 58 which is horizontal and extends laterally outwardly from said frame. A sleeve 60 equal in length to said stub shaft is rotatably mounted on said stub shaft, and secured thereon by washer 62 and screw 64 (see FIG. 3). A crank arm 66 is affixed to the inner end portion of said sleeve and projects radially therefrom. The piston rod 68 of a hydraulic cylinder 70 is pivoted to the outer end of crank 66 on a horizontal transverse axis, as at 72, and the cylinder is angled downwardly and rearwardly, being pivoted at 76, at its lower end to a bracket 74 affixed to vehicle frame 4. Cylinder 70 is double-acting, being provided with two hydraulic supply lines 78 and 80 whereby it may be operated in either direction. It's power and control system, including a hydraulic pump and valving mounted on the vehicle, may be standard and are not shown.

Tubular sleeve 18 of the attachment 20 is slidably engaged at its inner end portion over sleeve 60, as shown in FIG. 3, and is provided at its inner end with a rigidly affixed radially extending crank arm 82 directly adjacent crank arm 66 of sleeve 60. Crank arm 82 is provided at its outer end with a pair of angularly spaced apart notches 84 and 86 either of which, as shaft 18 is engaged over sleeve 60, may be engaged over a transverse pin 88 fixed in crank 66, whereby to secure the two cranks against relative rotation, so that operation of cylinder 70 will turn shaft 18 to pivot arm 20 and blade 24 upwardly or downwardly. The purpose of the two notches 84–86 will be described later. Crank 82 is secured on pin 88 by a washer 90 and cotter pin 92 on the outer end of said pin. The entire edger attachment assembly 16 may be removed from the vehicle, when its use is not desired, simply by removing said cotter pin and washer, or very quickly and easily remounted by reversing the process. The mounting assembly, including cylinder 70, crank 66, sleeve 60 and stub shaft 58, may be left permanently on the vehicle, being small, unobtrusive, and out-of-the-way, and may also serve for mounting attachments other than the lawn edger, such as a small cultivator or the like.

In the operation of the lawn edger, with arm 20 elevated by operation of cylinder 70 to raise blade 24 above ground level, and with arm 20 extending rearwardly from shaft 18, and the convex face of blade 24 facing inwardly toward vehicle 2, as illustrated, the vehicle is positioned to travel from right to left as viewed in FIGS. 1 and 2, running at the grass side of a line 94 (see FIG. 2) representing the edge of the pavement, until the blade is disposed over line 94. Arm 20 may be swung laterally by hand to facilitate this positioning of the blade. Cylinder 70 is then operated to pivot arm 20 downwardly, whereby to press the blade into the ground directly adjacent the edge of the pavement, until gauge wheel 50 engages the surface of the pavement. Then, as vehicle 2 moves from right to left, in a line generally parallel to line 94, blade 24 cuts through any grass or earth growing or extending across line 94 so to be above the pavement, with gauge wheel 50 determining and limiting the depth of cut. The severed grass and earth may then be disposed of in any suitable manner, the means for which disposal are not pertinent to the present invention. Also, the lateral thickness of the blade, which of course results from its dished form, forces the earth directly adjacent the pavement edge slightly apart from the pavement, thereby providing a neater and more pleasingly "dressed" appearance.

It is of course difficult, if not virtually impossible, to steer vehicle 2, or any vehicle, in a line precisely parallel to pavement edge 94. However, the lateral pivotability of arm 20 provides compensation for any deviation of the vehicle from this parallel travel, so that blade 24 may always be disposed against the pavement. This lateral movement of the blade could, for example, be performed manually by means of a handle affixed to the arm and extending to a position convenient to the vehicle driver occupying seat 10. In fact, this type of lateral blade guidance was used in an earlier model of the present device. However, in the present device, the concavo-convex form of the blade provides this guidance automatically. As the blade moves through the earth, the force of the earth against its convex side tends to move the blade toward its concave side, thereby biasing it toward the pavement to ride in wiping contact with the vertical edge surface of the pavement. Thus the blade will continue to seek and follow the pavement edge, despite deviations of vehicle travel from a line parallel to edge 94, so long as the lateral pivoting of arm 20 required for this following action lies within the lateral limits of movement of said arm. As shown, these limits are adequate to permit very inaccurate steering of the vehicle indeed.

It will be seen further that the pivoted parallelogram form of arm 20 allows the described lateral pivoting thereof to occur with no change in the angle of the face of said blade about a vertical axis. That is, the face of said blade moves with a parallel transitional movement, rather than pivoting, so that said blade is preserved in a substantially uniform "angle of attack" relative to the pavement edge. Normally, it is desired that the plane of the blade periphery be disposed vertically and parallel to the pavement edge, and the present structure is capable of maintaining this relationship at all lateral positions of the arm movement. However, in some circumstances, such as when operating in very soft earth, it may be desirable that the blade be "toed-in" toward the pavement, in its direction of travel, in order to increase the force of the earth thereagainst biasing it toward the pavement. This "toe-in" may be provided by inserting pivot pins 40 of bracket 22 selectively into different holes 42 of arm links 26, and holes 44 of bracket ears 38, whereby to angle the plane of the blade edge to the direction of vehicle travel. The pin holes of the respective members in which said pins engage are unequally spaced, so that by proper selection of the holes utilized, the forward angle of the vertical plane of the blade edge may be rather closely adjusted. Whether the blade is toed-in or not, the pressure thereof against the abrasive concrete as provided by the crowding of said blade by earth pressure thereagainst, causes the blade to be sharpened continuously. This self-sharpening action is a useful function.

As thus far described, vehicle 2 operates on the grass, moving from right to left as viewed in FIG. 1. The vehicle may also operate on the pavement, moving from left to right, if desired. In fact, operation of the vehicle on the pavement is usually preferred, since pavement provides better traction for vehicle drive wheels 6, but limitations of area for operation of the vehicle may require operation on either surface. In the present device, adjustment for operation of the vehicle from left to right, at the pavement side of line 94, may be accomplished easily and simply by removing pins 40, detaching bracket 22 from arm links 26, and reversing said bracket, side-for-side, so that the convex side of blade 24 faces away from the vehicle. The convex side of the blade will then face to the earth side of line 94, gauge wheel 50 will ride on the pavement, and the operation of the device will be substantially identical to that already described.

Also, arm 20 may be reversed to extend forwardly rather than rearwardly from shaft 18, by removing bracket 22 as already described, swinging the outer of arm links 26 around the end of shaft 18 to extend forwardly, removing the pivot pin 34 of the inner link 26, detaching said link and repositioning it to extend forwardly, reinserting its pivot pin 34, and reattaching bracket 22 by reinserting its pivot pins 40, taking care to position said bracket so that the convex side of blade 24 faces either inwardly or outwardly, depending on whether vehicle 2 is to operate on the grass or on the pavement. When making this reversal, it is desirable also to remove cotter pin 92 and washer 90, move shaft 18 slightly outwardly on sleeve 60 and turn it to engage notch 86 of crank 82 over pin 88 of crank 66, then remount the washer and cotter pin. This preserves a better operating angle between crank 66 and the axis of cylinder 70. The use of arm 20 in either its "pulling" or its "pushing" position is largely optional, since the change has no appreciable effect on the edging operation as described. However, while the "pulling" position is perhaps preferred, some operators prefer the "pushing" position when, as shown, it places blade 24 in a position in which an operator occupying seat 10 can more readily observe the blade and its operation. Also, the "pushing" position may be preferred where, as shown, it places the axis of rotation of blade 24 more nearly in alignment with the axis of the drive wheels 6 of the vehicle. This has been found to allow easier steering of the vehicle to cause blade 24 to follow a pavement edge when said pavement edge is curved, particularly when the curvature is of relatively short radius.

It will be apparent that, when blade 24 is not engaged in the ground, the lateral swinging movement of arm 20 should be restricted to maintain it in at least a generally operable position. Such swinging movement is restricted by the structure thus far described by the fact that if it swings too far in either direction, either blade 24 or gauge wheel 50 will engage one or the other of arm side links 26, thereby arresting lateral movement of the arm. In some circumstances, said lateral arm movement must be further restricted. For example, as shown, when arm 20 is reversed to project forwardly, it overlies the outer surface of corresponding drive wheel 6 of frame 2, and its inward swinging movement must be further restricted to prevent its becoming fouled with said wheel. For this purpose, a stop plate 96 is affixed to the forward side of shaft 18 between arm links 26, and extends forwardly. Said stop is so positioned that, by its engagement with the vertical cross bar 32 of one or the other of arm links 26, it limits lateral swinging of the arm to any desired degree. This of course increases the accuracy with which the vehicle must be steered, but is necessary in some situations.

While we have shown and described a specific embodiment of our invention, it will be readily apparent that many minor changes of structure and operation could be made without departing from the spirit of the invention.

What we claim as new and desire to protect by Letters Patent is:

1. A lawn edger attachment for a self-propelled vehicle, said attachment comprising:
   a. a horizontal shaft extending laterally from said vehicle,
   b. means mounting said shaft on said vehicle for oscillation about its axis,
   c. power means mountable on said vehicle and operable to oscillate said shaft,
   d. an elongated arm attached at one end to said shaft and projecting laterally and generally horizontally therefrom,
   e. a bracket attached to the extended end of said arm, and
   f. a circular coulter blade disposed in a generally vertical plane and carried for rotation on its axis by said bracket, said axis being generally parallel to said shaft, said arm constituting a parallelogram linkage including a pair of spaced apart generally parallel side links each pivoted at its respective ends to said shaft and to said bracket, for pivotal movement on parallel axes generally normal to a plane including the axes of said shaft and said coulter blade, whereby said arm may be pivoted angularly from side to side without correspondingly angling the vertical plane of said blade, said blade being operable by said power means, as the latter pivots said shaft, to be lowered into penetrating relation with the soil of a lawn at the line of demarcation between said lawn and a paved surface.

2. The device as recited in claim 1 with the addition of a gauge wheel carried rotatably by said bracket coaxially with said coulter blade, being of smaller diameter than said blade and spaced apart axially therefrom, whereby to roll on said pavement surface to limit the insertion of said blade into the ground.

3. The device as recited in claim 1 wherein said coulter blade is of concavo-convex form concentrically with its axis, whereby as said blade is moved through the soil by forward movement of said vehicle the pressure of the earth on the convex side of said blade will bias said blade, and pivot said arm, laterally of the direction of travel of said vehicle, said convex blade side being disposed at the lawn side of said line demarcation, whereby said blade is biased to and rides frictionally against the edge of the pavement.

4. The device as recited in claim 3 with the addition of a gauge wheel of smaller diameter than said blade and carried by said bracket for rotation coaxially with said blade, said gauge wheel being spaced apart axially from said blade at the concave side of the latter.

5. The device as recited in claim 3 wherein said bracket is readily detachable from said arm, and may be mounted on said arm selectively in either of two side-for-side reversed positions, whereby the convex side of said blade may be faced selectively either toward or away from said vehicle, whereby said vehicle may be operated at either the grass side or the pavement side of said line of demarcation.

6. The device as recited in claim 5 with the addition of a gauge wheel of smaller diameter than said blade and carried for rotation by said bracket coaxially with said blade, said gauge wheel being axially spaced apart from said blade at the concave side thereof.

7. The device as recited in claim 1 wherein said arm is readily detachable from said shaft and may be connected to said shaft to extend selectively either forwardly or rearwardly from said shaft.

8. The device as recited in claim 7 wherein said bracket is readily detachable from said arm, and may be mounted on said arm selectively in either of two side-for-side reversed positions.

9. The device as recited in claim 1 wherein said means mounting said shaft on said vehicle comprises:
 a. a stub shaft coaxial with said shaft and affixable to said vehicle,
 b. a sleeve rotatable on said stub shaft,
 c. a first crank affixed to said sleeve and extending radially therefrom, said power means being operable to oscillate said first crank, said shaft being tubular and being slidably and rotatably engageable over the outer end portion of said sleeve,
 d. a second crank affixed to said shaft and extending radially therefrom, and
 e. means rigidly but detachably connecting said first and second cranks, whereby said power means oscillates said shaft.

10. The device as recited in claim 9 with the addition of means operable to vary the angular relation between said first and second cranks.

* * * * *